United States Patent Office 3,639,349
Patented Feb. 1, 1972

3,639,349
TRIOXANE COPOLYMERS
Karlheinz Burg, Hofheim, Taunus, and Klemens Gutweiler and Hans Dieter Hermann, Frankfurt am Main, Germany, assignors to Farbwerke Hoechst Aktiengesellschaft vormals Meister Lucius & Bruning, Frankfurt am Main, Germany
No Drawing. Filed June 25, 1968, Ser. No. 739,666
Claims priority, application Germany, June 27, 1967, F 52,805
Int. Cl. C08g 1/14, 1/16
U.S. Cl. 260—67                    10 Claims

ABSTRACT OF THE DISCLOSURE

Copolymers of trioxane are prepared by copolymerizing trioxane with cyclic ethers or cyclic or linear acetals and, if desired, a tercomponent, and polyethylene oxide having an average molecular weight in the range of from 300 to 25,000 in the presence of a cationically active initiator.

This invention relates to trioxane copolymers.

It has been proposed to initiate the copolymerization of trioxane with cyclic ethers using cationic catalysts. The statistical synthesis of comonomeric units in the polyoxymethylene chain causes the formation of a synthetic plastic that is especially stable to alkalies and to thermal stress. The acetal polymerisation product obtained is thermoplastically workable, has very good strength properties and also has a high resistance to deformation. In addition to its favourable durability, this material also has an excellent resistance to rubbing, which is shown by a high ball pressure hardness.

It has also been proposed to admix suitable rubber-like polymers and brittle synthetic plastics to achieve an increase in the impact toughness coupled with a decrease in hardness.

Furthermore, German Auslegeschrift No. 1,139,974 discloses that by the introduction of gaseous formaldehyde into a solution of a polyalkylene oxide and a catalyst suitable for the polymerisation of formaldehyde in a liquid hydrocarbon a product is obtained which has improved impact toughness properties.

French specification No. 1,271,297 discloses that the cationic polymerisation of solutions of polypropylene oxide in molten trioxane leads to thermally and chemically stable polyoxymethylenes, but they do not possess good impact toughness properties. During the polymerisation reaction described in that specification repeated splitting of the polyether chain takes place, so that only relatively short polypropylene oxide fragments enter the polyoxymethylene chain. These short polyether blocks do not suffice to impart an adequate impact toughness to the product but their statistical incorporation in the polyoxymethylene chain ensures the formation of a polymer that is stable to alkalies.

The polymerisation of a solution of polyethylene oxide in molten trioxane leads to a product having an unsatisfactory impact toughness, and the polymer undergoes a degradation of about 80 percent by weight when treated with alkali.

The present invention is based on the observation that products having very good impact toughness coupled with good stability to alkalies are obtained by the copolymerization of trioxane with:

(a) From 0.1 to 60 percent, based on the total weight of the mixture, of a cyclic ether or a cyclic or linear acetal and, if desired, from 0.05 to 5 percent, based on the total weight of the mixture, of an alkyl-glycidyl-formal, a polyglycol glycidyl ether, a bis-(alkane-triol)-triformal or a prepolymer having a molecular weight in the range of from 176 to 2,000 which is prepared from 1 mol of a 1,2-(5-11)-triol, 0 to 1 mol of an $\alpha,\omega$-diol having a molecular weight from 62 to 1,000, 0 to 1 mol of a monohydric alcohol containing from 1 to 11 carbon atoms and 1 mol of formaldehyde, and (b) From 0.1 to 15 percent, based on the total weight of the mixture, of a polyethylene oxide having an average molecular weight in the range of from 300 to 25,000, the copolymerization being carried out at a temperature between the melting point and the boiling point of trioxane in the presence of from 0.0001 to 1 mol percent, based on the sum of the monomers, of a cationically active initiator.

It appears that when polyethylene oxide is used, instead of polypropylene oxide, no ether splitting takes place during the polymerisation reaction, so that only comparatively long polyether blocks are incorporated by means of their terminal hydroxyl groups into the polyacetal chain.

The cyclic ethers or cyclic acetals are, in general, used in proportions in the range of from 0.1 to 60 percent by weight. Advantageously, the proportions of these comonomers range from 0.5 to 15 percent by weight, and especially good products are obtained when the proportions range from 1 to 5 percent by weight.

As cyclic ethers and cyclic acetals there may especially be mentioned compounds of the formula (I)

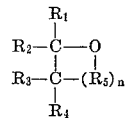

wherein $R_1$, $R_2$, $R_3$ and $R_4$, which may be the same or different, each represents a hydrogen atom or an alkyl group containing from 1 to 5 carbon atoms which may be substituted by from 1 to 3 halogen atoms, and $R_5$ represents a methylene or an oxymethylene radical, which may be substituted by an alkyl group containing from 1 to 5 carbon atoms, which alkyl group may be substituted with from 1 to 3 halogen atoms, in which case $n$ is 0, 1, 2 or 3; or $R_5$ represents the radical

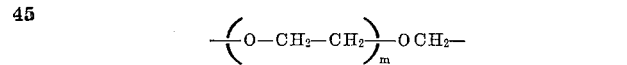

in which case $n$ is 1 and $m$ is 1, 2 or 3. The halogen atoms are preferably chlorine atoms.

There are preferably used cyclic ethers having from 3 to 5 members in the ring or cyclic acetals, especially cyclic formals, having from 5 to 9 members in the ring.

Ethylene oxide is especially suitable as cyclic ether, propylene oxide and epichlorhydrin also being suitable. As cyclic acetals there may especially be used glycol-formal (1,3-dioxolane), diglycol-formal and 4-chloromethyl-dioxolane also being suitable.

Cyclic or linear acetals of long-chain $\alpha,\omega$-diols, preferably cyclic formals of $\alpha,\omega$-diols having 4 to 8 carbon atoms, for example, butane-diol-formal and hexane-diol-formal are also suitable comonomers. As linear acetals may especially be used the primary polymers consisting of polyacetals or polyether acetals disclosed in British Pat. No. 1,010,072.

The alkyl-glycidyl-formals, polyglycol diglycidyl ethers and bis-(alkane-triol)-triformals, when present, increase the flow capacity of the product and are preferably used in a proportion of from 0.05 to 2 percent, based on the total weight of the monomer mixture.

As alkyl-glycidyl-formals there may be mentioned compounds of the Formula II (II) 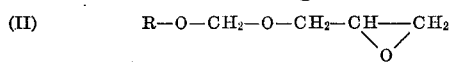

in which R represents an aliphatic alkyl radical containing from 1 to 10, preferably from 1 to 5, carbon atoms. Especially suitable are alkyl-glycidyl-formals of the above formula having linear saturated aliphatic alkyl radicals, for example, methyl-glycidyl-formal, ethyl-glycidyl-formal, propyl-glycidyl-formal and butyl-glycidyl-formal.

As polyglycol diglycidyl ethers there may be mentioned compounds of the Formula III (III) 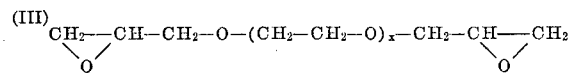

in which $x$ represents a whole number from 2 to 5. Especially suitable are polyglycol diglycidyl ethers of the above formula in which $x$ is 2 or 3, for example, diethylene glycol diglycidyl ether and triethylene glycol-diglycidyl ether.

Among bis-(alkane-triol)-triformals there may be mentioned compounds containing one linear and two cyclic formal groups, especially compounds of the Formula IV (IV) 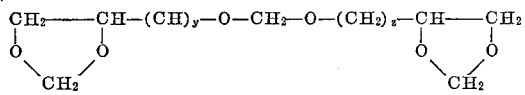

in which $y$ and $z$, which may be the same or different, each represents a whole number from 3 to 9, advantageously 3 or 4. Especially suitable are symmetrical bis-(alkane-triol)-triformals of the aforesaid formula in which $y$ and $z$ each represent the same number, for example, bis-(1,2,5-pentane-triol)-triformal and, preferably, bis-(1,2,6-hexane-triol)-triformal.

Furthermore, there are suitable as ter-components, prepolymers having molecular weights in the range of from 176 to 2,000 which are prepared from 1 mol of a 1,2-(5,11)-triol, 0 to 1 mol of an α,ω-diol having a molecular weight from 62 to 1,000, 0 to 1 mol of a monohydric alcohol containing from 1 to 11 carbon atoms and 1 mol of formaldehyde.

The polyethylene oxides used in the process of the present invention have molecular weights within the range of from 300 to 25,000. It is advantageous to use polyethylene oxides having molecular weights in the range of from 2,000 to 15,000, preferably in the range of from 4,000 to 10,000. The proportion of the polyethylene oxide based on the total weight of the monomer mixture amounts to from 0.1 to 15 percent advantageously from 0.5 to 10 percent, and preferably from 2 to 6 percent.

The polymerisation is advantageously carried out in bulk at temperatures between the melting point and the boiling point of the trioxane, that is to say between 62° C. and 115° C. at normal atmospheric pressure.

For initiating the copolymerisation there are especially used Lewis acids, preferably boron trifluoride. Complex compounds of Lewis acids, for example, etherates and amine complexes may also be used. Catalysts that have a similarly good activity and are preferred because they are convenient to handle and the quantity in which they are used can be controlled, are salts of Lewis acids, for example, their oxonium salts. The proportion of the catalyst used is within the range of from 0.0001 to 1.0 mol percent, and preferably within the range of from 0.001 to 0.1 mol percent, calculated on the quantity of the monomers used. As an increase in the proportion of catalyst increases the speed of polymerisation, the proportion is so chosen that it is possible to abstract satisfactorily the liberated heat of polymerisation.

After the polymerisation the block polymerisation product may be ground for the purpose of further treatment, and may then be hydrolysed in the usual manner in an alkaline medium at a raised temperature. This may be carried out, for example, in benzyl alcohol at 150° C. in the presence of triethanolamine.

As a measure of the impact toughness of a thermoplast there is used in the following description the height at which a falling body having a weight of 500 grams just breaks a tensioned pressure-moulded foil 1 millimetre thick. An increase in the height of fall denotes an increase in the impact toughness of the sample tested. In the following table the impact toughnesses of the products obtained in Examples 1 to 6 are compared.

| Example | Product | Reduced viscosity [1] | Height of fall in cms. |
| --- | --- | --- | --- |
| 1 (comparison) | Copolymer of trioxane and 3% by weight of 1,3-dioxolane | 0.71 | 50 |
| 2 (comparison) | Copolymer of trioxane and 3% by weight of 1,3-dioxolane | 0.56 | 25 |
| 3 | Copolymer of trioxane and 3% by weight of 1,3-dioxolane, to which was added before polymerisation began 2% by weight of polyethylene oxide (MW 3,000). | 0.69 | 75 |
| 4 | Copolymer of trioxane and 3% by weight of 1,3-dioxolane, to which was added before polymerisation began 3% by weight of polyethylene oxide (MW 3,000). | 0.58 | 100 |
| 5 (comparison) | Trioxane homopolymer to which was added before polymerisation began 3% by weight of polyethylene oxide (MW 3,000). | 0.36 | 25 |
| 6 | Copolymer of trioxane and 3% by weight of 1,3-dioxolane, to which was added before polymerisation began 3% by weight of polyethylene oxide (MW 10,000). | 0.70 | 100 |

[1] Measured in butyrolacetone at 140° C. at a concentration of 0.5 gram per 100 ml.

It will be seen from the table that even an addition of only 2 or 3 percent by weight of polyethylene oxide having an average molecular weight of 3,000 to the polymerization mixture results in a pronounced improvement in the impact toughness.

The products produced by the process of the invention are thermoplastically workable and can be made into foils, films, bands or injection-moulded products.

The following Examples 3, 4 and 6 illustrate the invention. Examples 1, 2 and 5 are given for the purposes of comparison. In all the examples the parts and percentages are by weight.

EXAMPLE 1

0.05 part of $BF_3 \cdot O(C_4H_9)_2$ was added to a mixture of 970 parts of trioxane, 30 parts of 1,3-dioxolane and 0.5 part methanol at 70° C. with the exclusion of atmospheric moisture, and the whole was thoroughly mixed. After 45 seconds the batch was polymerised to a solid mass. It was maintained for 30 minutes at this temperature and was then cooled in ice-water. The block polymerisation product so obtained was ground, and was dissolved at 150° C. in 1 litre of benzyl alcohol which contained 3 percent of triethanolamine. After being stirred at this temperature for 30 minutes, the solution was cooled to 90° C. and methanol was added. After filtering off the product and extracting it at the boil three times with methanol, a white powder was obtained having the following properties: $\eta_{red}=0.71$ (measured in butyrolactone at 140° C.) The height of fall in the test described above was 50 cm.

The alkaline treatment at 150° C. resulted in a degradation amounting to 8.2 percent, which is referred to hereinafter as the hydrolysis loss.

EXAMPLE 2

The procedure was the same as that described in Example 1, with the exception that 0.7 part of methanol was incorporated in the initiation mixture, instead of 0.5 part of methanol. The properties of the product were as follows: $\eta_{red}=0.56$; height of fall 25 cm.; hydrolysis loss 9.5 percent.

EXAMPLE 3

0.2 part of $HF_3 \cdot O(C_4H_9)_2$ was added to a mixture of 950 parts of trioxane, 30 parts of 1,3-dioxolane and 20 parts of polyethylene oxide having an average molecular weight of 3,000 under the conditions described in Example 1, and the whole was thoroughly mixed. After 20 minutes the batch had polymerised to a solid mass. It was maintained for 30 minutes at 70° C. and further treated in the manner described in Example 1. The product had the following properties: $\eta_{red}=0.69$; height of fall 75 cm.; hydrolysis loss 10.2 percent.

EXAMPLE 4

0.3 part of $BF_3 \cdot O(C_4H_9)_2$ was added to a mixture of 940 parts of trioxane, 30 parts of 1,3-dioxolane and 30 parts of polyethylene oxide having an average molecular weight of 3,000 under the conditions described in Example 1, and the whole was thoroughly mixed. After 25 minutes the batch had polymerised to a solid mass. The product was maintained for 30 minutes at 70° C. and further treated as described in Example 1. The product had the following properties: $\eta_{red}=0.58$; height of fall 100 cm.; hydrolysis loss 8.9 percent.

EXAMPLE 5

0.3 part of $BF_3 \cdot O(C_4H_9)_2$ was added to a mixture of 970 parts of trioxane and 30 parts of polyethylene oxide having an average molecular weight of 3,000 under the conditions described in Example 1, and the whole was thoroughly mixed. After 12 minutes the batch had polymerised to a solid mass. The product was then maintained for 30 minutes at 70° C. and further treated as described in Example 1. The product had the following properties: $\eta_{red}=0.36$; height of fall: less than 25 cm.; hydrolysis loss 80.8 percent.

EXAMPLE 6

0.4 part of $BF_3 \cdot O(C_4H_9)_2$ was added to a mixture of 920 parts of trioxane, 30 parts of 1,3-dioxolane and 50 parts of polyethylene oxide haping an average molecular weight of 10,000 under the conditions described in Example 1, and the whole was thoroughly mixed. After 20 minutes the batch had polymerised to a solid mass. The product was then maintained for 30 minutes at 70° C. and further treated as described in Example 1. The product had the following properties: $\eta_{red}=0.70$; height of fall 100 cm.; hydrolysis loss 9.7 percent.

What we claim is:

1. A copolymer of trioxane prepared by copolymerizing trioxane with (a) from 0.1 to 60 percent, based on the total weight of the mixture, of a linear acetal or a compound of the formula:

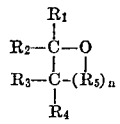

wherein $R_1$, $R_2$, $R_3$ and $R_4$, which may be the same or different, represent a hydrogen atom or an alkyl or haloalkyl group of 1 to 5 carbon atoms, $R_5$ represents a methylene or oxymethylene radical which may be substituted by an alkyl or haloalkyl group of 1 to 5 carbon atoms, and $n$ is 0 to 3, or $R_5$ represents the radical $$-(OCH_2-CH_2)_m-OCH_2-$$

with $n$ being 1 and $m$ being 1 to 3 and (b) from 0.1 to 15 percent, based on the total weight of the mixture, of a polyethylene oxide having an average molecular weight in the range of 2,000 to 15,000, the copolymerization being carried out at a temperature between the melting point and boiling point of trioxane in the presence of from 0.0001 to 1 mol percent, based on the total weight of monomers, of a cationically active initiator.

2. A copolymer as claimed in claim 1 wherein there is present from 0.5 to 10 percent, based on the total weight of the monomer mixture, of the polyethylene oxide.

3. A copolymer as claimed in claim 1, wherein there is present from 2 to 6 percent, based on the total weight of the monomer mixture, of the polyethylene oxide.

4. A copolymer as claimed in claim 1 wherein the (a) component is a cyclic ether having 3 to 5 members in its ring.

5. A copolymer as claimed in claim 1 wherein the (a) component is a cyclic acetal having 5 to 9 members in its ring.

6. A copolymer as claimed in claim 5, wherein the cyclic acetal is hexane-diol-formal.

7. A copolymer as claimed in claim 1, wherein the average molecular weight of the polyethylene oxide is in the range of from 4,000 to 10,000.

8. A copolymer as claimed in claim 4, wherein the cyclic ether is ethylene oxide.

9. A copolymer as claimed in claim 5, wherein the cyclic acetal is 1,3-dioxolane.

10. A product according to claim 1 wherein the polymerization reaction mixture contains from 0.05 to 5 percent of an alkyl-glycidyl which also contains 0.05 to 5 percent of an alkyl-glycidyl-formal, a polyglycol glycidyl ether, a bis-(alkane-triol)-triformal or a prepolymer having a molecular weight in the range of from 176 to 2,000 which is prepared from 1 mol of a 1,2,(5-11)-triol, 0 to 1 mol of an alpha, omega-diol having a molecular weight from 62 to 1,000, 0 to 1 mol of a monohydric alcohol containing from 1 to 11 carbon atoms and 1 mol of formaldehyde.

References Cited

UNITED STATES PATENTS

| | | | |
|---|---|---|---|
| 3,256,246 | 6/1966 | Gutweiler | 260—67 |
| 3,346,663 | 10/1967 | Kern et al. | 260—823 |
| 3,385,827 | 5/1968 | Fischer et al. | 260—67 |
| 3,453,238 | 7/1969 | Fischer et al. | 260—67 |
| 3,457,228 | 7/1969 | Fischer et al. | 260—67 |
| 3,457,229 | 7/1969 | Fischer et al. | 260—67 |

WILLIAM H. SHORT, Primary Examiner

L. M. PHYNES, Assistant Examiner

U.S. Cl. X.R.

260—823, 830, 45.9 P, 45.95